United States Patent
Hromas et al.

(10) Patent No.: US 10,616,054 B2
(45) Date of Patent: Apr. 7, 2020

(54) MEDIA PLAYER WITH A WIRELESS ACCESS POINT FOR SUPPORTABILITY

(71) Applicant: NCR Corporation, Duluth, GA (US)

(72) Inventors: Darren Ross Hromas, College Station, TX (US); Omar Javier Rodriguez, College Station, TX (US)

(73) Assignee: NCR Corporation, Atlanta, GA (US)

( * ) Notice: Subject to any disclaimer, the term of this patent is extended or adjusted under 35 U.S.C. 154(b) by 110 days.

(21) Appl. No.: 15/796,505

(22) Filed: Oct. 27, 2017

(65) Prior Publication Data
US 2019/0132202 A1 May 2, 2019

(51) Int. Cl.
| | | |
|---|---|---|
| H04L 12/24 | (2006.01) | |
| H04W 12/06 | (2009.01) | |
| H04W 48/02 | (2009.01) | |
| H04W 24/04 | (2009.01) | |
| H04L 29/08 | (2006.01) | |

(52) U.S. Cl.
CPC .......... *H04L 41/0816* (2013.01); *H04L 41/28* (2013.01); *H04L 67/1044* (2013.01); *H04W 12/06* (2013.01); *H04W 24/04* (2013.01); *H04W 48/02* (2013.01)

(58) Field of Classification Search
CPC . H04L 41/0816; H04L 67/1044; H04L 41/28; H04W 12/06; H04W 24/04; H04W 48/02
See application file for complete search history.

(56) References Cited

U.S. PATENT DOCUMENTS

| | | | | |
|---|---|---|---|---|
| 2005/0078330 A1* | 4/2005 | Ball | ................... | G03G 15/5066 358/1.13 |
| 2010/0279652 A1* | 11/2010 | Sharp | ................... | G06F 9/4843 455/410 |
| 2013/0291064 A1* | 10/2013 | Ayvaz | ..................... | G06F 21/00 726/4 |
| 2015/0007350 A1* | 1/2015 | Gudipati | ................. | G06F 21/54 726/30 |
| 2015/0140986 A1* | 5/2015 | Lamb | .................. | H04L 41/0659 455/418 |
| 2015/0317243 A1* | 11/2015 | Green | .................. | G06Q 20/127 714/38.1 |
| 2016/0150412 A1* | 5/2016 | Liu | ........................ | G06F 16/334 370/338 |
| 2017/0200021 A1* | 7/2017 | Patel | ................... | G06F 21/6245 |
| 2018/0103055 A1* | 4/2018 | Keohane | ............. | H04L 63/1433 |

* cited by examiner

*Primary Examiner* — Gil H. Lee
(74) *Attorney, Agent, or Firm* — Schwegman, Lundberg & Woessner

(57) ABSTRACT

Disclosed herein is a media player. The media player may include a display, a network adapter, a processor, and a memory. The processor may be in electrical communication with the display and the network adapter. The memory may store instructions that, when executed by the processor, cause the processor to: validate login information received from a handheld computing device, and enter a service mode of operation upon validating the login information.

17 Claims, 3 Drawing Sheets

MEDIA PLAYER WITH A WIRELESS ACCESS POINT FOR SUPPORTABILITY

SUMMARY

Media players may be used in public locations to display information. For example, media players may be located in public areas such as airports and may display flight information. In addition, media players may be located in restaurants and display menu items. The media players may be located in areas that are hard to reach should maintenance or other service may be needed.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
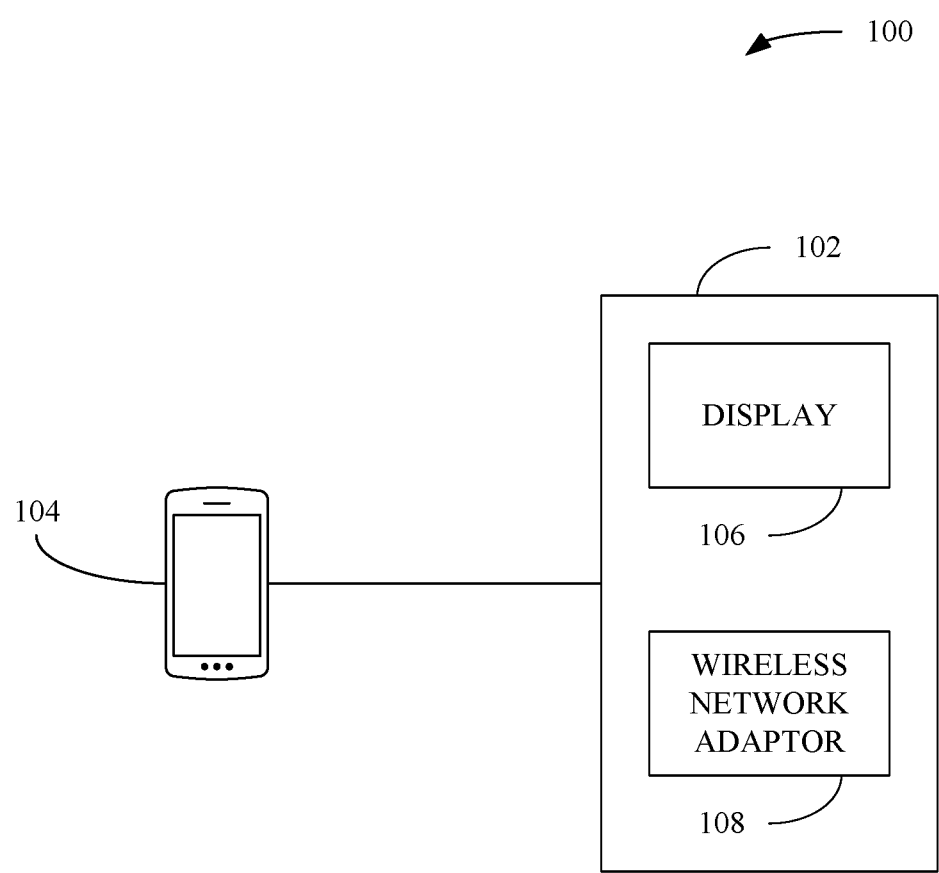
FIG. 1 shows an example media player environment consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Media player may be embedded devices that may not have a mouse, keyboard, or other input/output (I/O) device connected to them. While it may be possible to plug a mouse, keyboard, or other I/O device into the media player, the media player may be mounted behind a protective shield (e.g., in a public space such as a baseball stadium) or the media player may be mounted high on a wall or other structure, thus making access difficult or impossible. This creates a problem for onsite support. To service the media player a technician may have to pull down mounted displays or rearrange equipment to access the media player and plug in a keyboard or other I/O device. Once the I/O device is connected, the technician must remain near the media player to troubleshoot any malfunctions. If the business utilizing the media player is currently open, this typically means that the support technician is in the way of the business's staff. Depending on where the media player is located, there can also be safety concerns with accessing the media layer. For example, the media player may be positioned in a high location, or mounted over other equipment that cannot be moved.

As disclosed herein, the media player includes a wireless network adapter and may host a wireless access point. Using the wireless access point a service technician or installation technician may access the media player using a handheld computing device without having to establish a physical (i.e., wired) connection to the media player. The media player may include software that may allow the technician to configure or reconfigure the media player, upload new content to be displayed on the media player, perform diagnostic functions, download logs generated by the media player, etc.

For example, to connect to the media player, the technician may configure the wireless network settings of his or her handheld computing device to connect to the media player's wireless access point. While the handheld computing device is connected to the media player, the media player may block attempts of other devices that try to attempt to connect to the media player. In addition, the media player may not attempt to route any communication to another network or device. Stated another way, when the media player and handheld computing device are connected, a peer-to-peer wireless network may be formed. After connecting to the media player, the technician may launch the support tool installed on the handheld device. The support tool may be specific to the media player or the handheld device. In addition, the support tool may be transmitted to the handheld device once the handheld device connects to the media player.

FIG. 1 shows an example operating environment 100 consistent with this disclosure. As shown in FIG. 1, the operating environment 100 may include a media player 102 and a handheld computing device 104. As described in more detail below with regards to FIG. 2, the media player may include a display 106 and a wireless network adaptor 108. The display 106 may be used to display media on the media player 102 as well as information used by a technician when servicing or installing the media player.

As disclosed herein, the handheld computing device 104 may connect to the media player 102 using the wireless network adaptor 108 to form a peer-to-peer network. Once the handheld computing device 104 is connected to the media player 102, the media player may discontinue a normal mode of operation and enter a service mode or a configuration mode. For example, upon the handheld device 104 connecting to the media player 102, the media player 102 may discontinue a playback mode where digital content is displayed on the display 106. Upon discontinuing the playback mode, the media player 102 may enter a service mode. Entering the service mode may include the media player 102 displaying, on the display 106, a service screen showing service options, diagnostic data, logs of data collected by the media player etc. Also, upon discontinuing the playback mode, the media player 102 may generate service logs or otherwise compile data that may be used for serving the medial player 102.

To establish the connection, the media player 102 may validate login information provided by the technician via the handheld computing device 104. For example, the technician may enter a username and password via the handheld computing device 104. The handheld computing device 104 may transmit the username and password to the media player 102, which may then validate that the technician has permission to connect to the media player 102. To validate the login information, the media player 102 may access an online database that includes login credentials of authorized users.

In an additional example, the handheld computing device 104 may transmit a serial number associated with the handheld computing device 104 instead of or with the username and password. The serial number may then be compared to a list of known devices. Stated another way, to validate the handheld computing device 104, the media player 102 may determine that the handheld device 104 is a known device. If the handheld computing device 104 is not a known device, the media player 102 may deny the connection and access to the media player 102 by the handheld computing device 104.

The list of known devices may be stored in a memory of the media player 102, thus, the media player 102 may not need to be connected to a network, such as the Internet, to obtain the list of known devices. Having the media player 102 not connected to the Internet may help secure the media player 102 from unauthorized access and prevent a virus, malware, worm, or other harmful items from being installed on the media player 102.

Once connected to the media player 102, the handheld computing device 104 may project its screen onto the display 106. In addition, the handheld computing device 104 may mirror its display onto the display 106.

Figure 2:
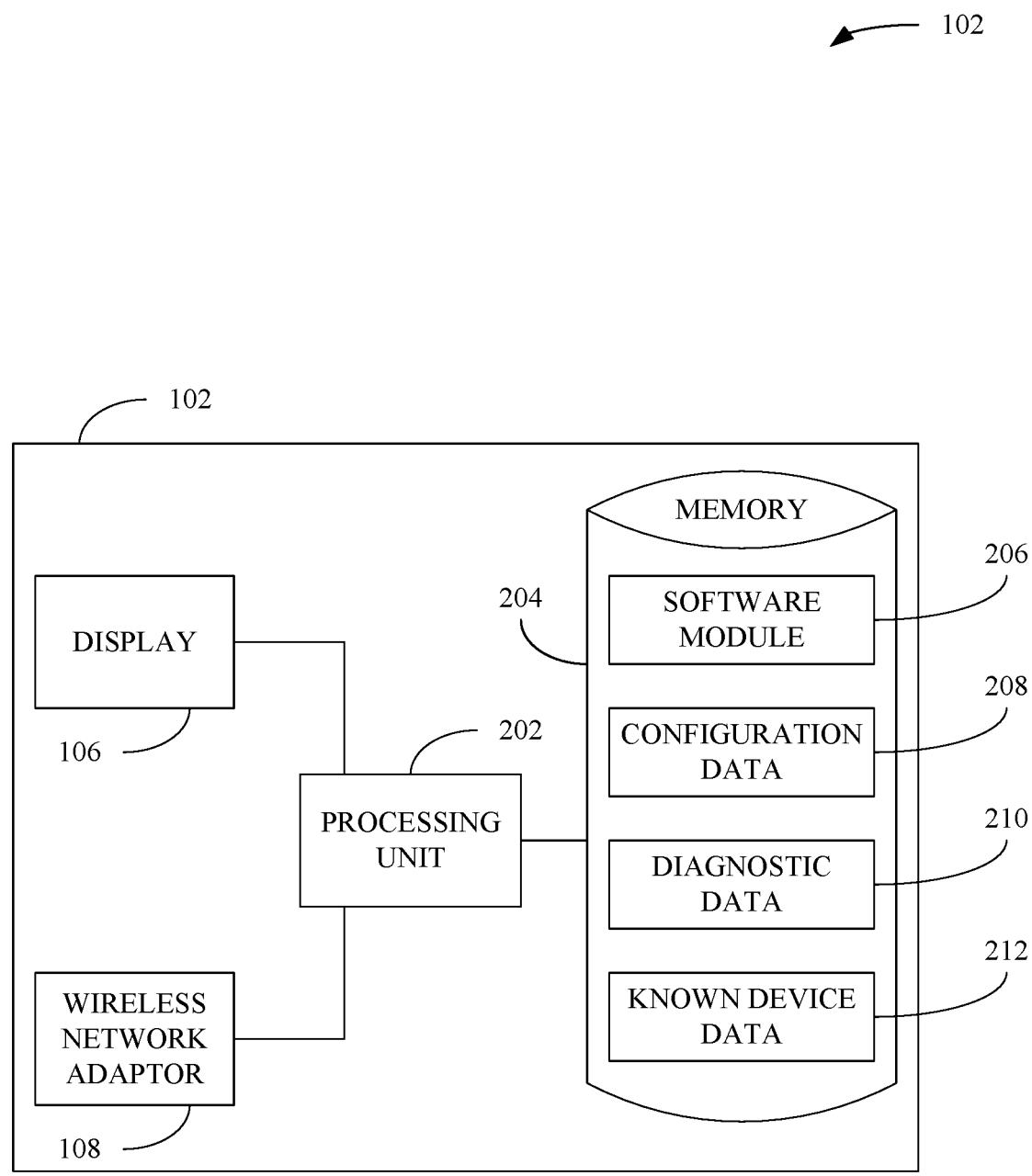
FIG. 2 shows an example schematic of a media player consistent with this disclosure.

FIG. 2 shows an example schematic of the media player 102. As shown in FIG. 2, the media player 102 may include a processing unit 202 and a memory 204. The memory 204 may include a software module 206, configuration data 208, diagnostic data 210, and known device data 212. While executing on processing unit 202, the software module 204 may perform processes for allowing the handheld computing device 104 to access the media player 102, including, for example, one or more stages included in a method 300 described below with respect to FIG. 3.

As indicated above, the media player 102 may include the display 106. The display 106 may include a plasma display, a light emitting diode (LED) display, a liquid crystal display (LCD), etc. The display 106 may be used to display information, such as service menus, configuration data, diagnostic data, etc., stored in the memory 204. In addition, the display 106 may be used to display information, such as service menus or other data, transmitted to the media player 102 from the handheld computing device 104.

The wireless network adapter 108 may allow the media player 102 to communicate with information systems and external computing devices. For example, as disclosed herein, the wireless network adapter 108 may allow the media player to communicate with remote services to obtain content to be displayed on the display 106 and with the handheld computing device 104. Non-limiting examples of the wireless network adapter 108 include, wireless Ethernet cards, Bluetooth® transmitters and receivers, near-field communications modules, etc.

The configuration data 208 may include system settings for the media player 102 such as resolution, display brightness, tint, color balance, etc. The configuration data 208 can be adjusted as disclosed herein using the handheld computing device 104. For example, the resolution, display brightness, tint, and color balance can be adjusted using the handheld computing device 104 to achieve a desired look on the display 106. For instance, depending on the lighting around the media player 102, the configuration data 208 can be adjusted to achieve a desired look.

The diagnostic data 210 may include system logs, use statistics, error logs, error codes, etc. The diagnostic data 210 may be generated during use of the media player 102 or when a command is received from the handheld computing device 104. For example, when an error occurs an error code may be saved in an error log. In another example, when the handheld computing device 104 connects to the media player 102, a diagnostic program may execute and generate diagnostic data 210. For instance, when the handheld computing device 104 connects to the media player 102, the diagnostic program may execute and generate a use log, perform diagnostics, and generate the diagnostic data 210.

Figure 3:
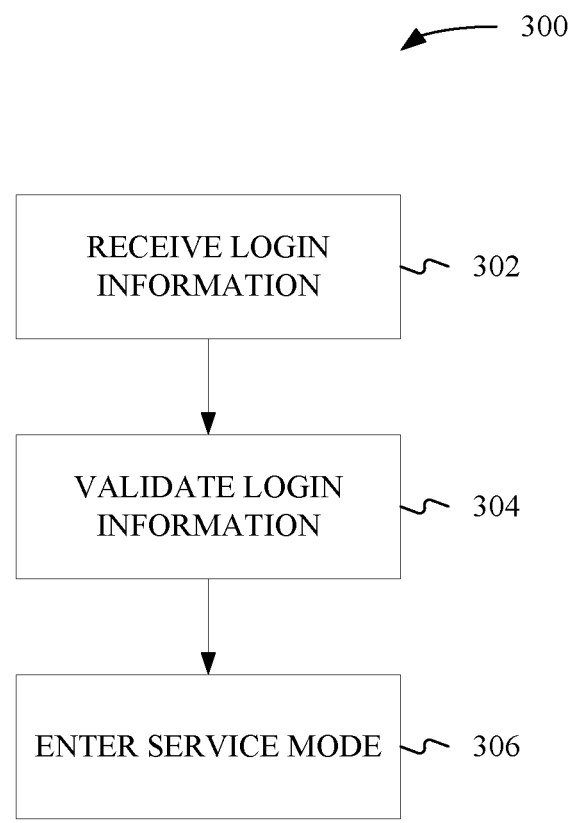
FIG. 3 shows an example method consistent with this disclosure.

FIG. 3 shows an example method 300 for accessing a media player, such as the media player 102. The method 300 may begin at stage 302, where the media player may receive login information. As disclosed herein, the login information may include a username and password from a handheld computing device, such as handheld computing device 104. In addition to, or as an alternative to, the username and password the media player may receive a serial number of the handheld computing device. For example, a technician may enter a username and password at the handheld computing device and then the handheld computing device may transmit the serial number of the handheld computing device to the media player.

From stage 302 the method 300 may proceed to stage 304 where the media player may validate the login information. As disclose herein, validating the login information may include the media player connecting with a server so as to authenticate the username and password or to compare a serial number of the handheld computing device against a list of known devices. In another example, the media player may access a listing of known devices stored on a memory of the media player to determine if the handheld computing device is a known device. If the handheld computing device is not a known device, the media player may disallow the handheld computing device to connect to the media player.

From stage 304 the method 300 may proceed to stage 306 where the media player may enter a service mode. When entering the service mode, the media player may discontinue a normal mode of operation. For example, as disclosed herein, the media player may discontinue a playback mode when the media player enters the service mode.

As disclosed herein, entering the service mode may include establishing a screen sharing session between the media player and the handheld computer device. The screen sharing session may allow the media player to display information displayed on the handheld computing device. The information may be transmitted to the media player from the handheld computing device for displaying.

Entering the service mode may also include the media player entering a configuration mode where configuration data may be exchanged between the media player and the handheld computing device. For example, upon entering the configuration mode, the media player may transmit its current configuration to the handheld computing device. The current configuration data may also be displayed on the media player. The technician may edit the configuration data and the updated configuration data may be transmitted to the media player. In addition, the handheld computing device may also transmit a command to the media player that causes the media player to reset or otherwise edit the configuration data. For example, the technician may edit the color or tint of the media player by editing the configuration data on the handheld computing device and transmitting the updated configuration data to the media player or the handheld device may transmit a command to the media player to cause a change in the configuration data.

Entering the service mode may also include the media player entering a diagnostic mode. The diagnostic mode may include the handheld computing device transmitting a diagnostic command to the media player. The media player may execute the diagnostic function. As disclosed herein, the diagnostic mode may include the media player performing self-diagnostics, transmitting error logs, error codes, or other diagnostic data to the handheld computing device or displaying the diagnostic data on the media player.

EXAMPLES

Example 1 is a media player comprising: a display; a network adapter; a processor in electrical communication with the display and the network adapter; and a memory storing instructions that, when executed by the processor, cause the processor to: validate login information received from a handheld computing device, and enter a service mode of operation upon validating the login information.

In Example 2, the subject matter of Example 1 optionally includes wherein the instructions, when executed by the processor, further cause the processor to establish, with the handheld computing device, a peer-to-peer network.

In Example 3, the subject matter of Example 2 optionally includes wherein the instructions, when executed by the processor, further cause the processor to deny access to the peer-to-peer network from a second handheld computing device.

In Example 4, the subject matter of any one or more of Examples 1-3 optionally include wherein validating the login information includes instructions that, when executed by the processor, further cause the processor to confirm the handheld device is registered with the media player.

In Example 5, the subject matter of any one or more of Examples 1-4 optionally include wherein entering the service mode includes instructions that, when executed by the processor, further cause the processor to: receive a configuration change from the handheld computing device; and reconfigure a setting of the media player based on the configuration change.

In Example 6, the subject matter of any one or more of Examples 1-5 optionally include wherein entering the service mode includes instructions that, when executed by the processor, further cause the processor to: receive, from the handheld computing device, a diagnostic command; and execute a diagnostic function based on the diagnostic command.

In Example 7, the subject matter of any one or more of Examples 1-6 optionally include wherein entering the service mode includes instructions that, when executed by the processor, further cause the processor to discontinue a normal mode of operation.

Example 8 is a system comprising: a handheld computing device comprising a first wireless network adapter; a media player comprising a display, a second wireless network adapter, a processor, and a memory storing instructions that, when executed by the processor, cause the processor to: receive, via the second wireless network adapter, login information from the handheld computing device, validate the login information, and enter a service mode of operation upon validating the login information, wherein the handheld computing device is a known device to the media player.

In Example 9, the subject matter of Example 8 optionally includes wherein the instructions, when executed by the processor, further cause the processor to establish, with the handheld computing device, a peer-to-peer network.

In Example 10, the subject matter of Example 9 optionally includes wherein the instructions, when executed by the processor, further cause the processor to deny access to the peer-to-peer network from a second handheld computing device.

In Example 11, the subject matter of any one or more of Examples 8-10 optionally include wherein validating the login information includes instructions that, when executed by the processor, further cause the processor to establish a screen sharing session with the handheld computing device.

In Example 12, the subject matter of any one or more of Examples 8-11 optionally include entering the service mode includes instructions that, when executed by the processor, further cause the processor to: receive a configuration change from the handheld computing device; and reconfigure a setting of the media player based on the configuration change.

In Example 13, the subject matter of any one or more of Examples 8-12 optionally include wherein the handheld computing device is one of a plurality of known devices, each of the plurality of known devices identifiable to the media player by a unique serial number or a token.

In Example 14, the subject matter of any one or more of Examples 8-13 optionally include entering the service mode includes instructions that, when executed by the processor, further cause the processor to: receive, from the handheld computing device, a diagnostic command; and execute a diagnostic function based on the diagnostic command.

In Example 15, the subject matter of any one or more of Examples 8-14 optionally include wherein entering the service mode includes instructions that, when executed by the processor, further cause the processor to discontinue a normal mode of operation.

Example 16 is a non-transitory computer readable medium storing instructions that, when executed by a processor, cause the processor to: receive, at a media player from a handheld computing device, login information, wherein the handheld computing device is a known device to the media player; validate the login information; enter a service mode of operation upon validating the login information; and discontinue a normal mode of operation.

In Example 17, the subject matter of any one or more of Examples 15-16 optionally include wherein the instructions, when executed by the processor, further cause the processor to: establish, between media player and the handheld computing device, a peer-to-peer network; and deny access to the peer-to-peer network from a second handheld computing device.

In Example 18, the subject matter of any one or more of Examples 16-17 optionally include wherein validating the login information includes instructions that, when executed by the processor, further cause the processor to confirm the handheld device is one of a plurality of known devices registered with the media player.

In Example 19, the subject matter of any one or more of Examples 16-18 optionally include entering the service mode includes instructions that, when executed by the processor, further cause the processor to: receive a configuration change from the handheld computing device; and reconfigure a setting of the media player based on the configuration change.

In Example 20, the subject matter of any one or more of Examples 16-19 optionally include entering the service mode includes instructions that, when executed by the processor, further cause the processor to: receive, from the handheld computing device, a diagnostic command; and execute a diagnostic function based on the diagnostic command.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A media player comprising:
   a display;
   a network adapter;
   a processor in electrical communication with the display and the network adapter; and
   a memory storing a support tool and instructions that, when executed by the processor, cause the processor to:
      validate login information received from a handheld computing device, wherein the handheld computing device is known to the media player,
      transmit the support tool to the handheld computing device upon validating the login information, and
      enter a service mode of operation by the media player upon transmitting the support tool, wherein entering the service mode includes instructions that, when executed by the processor, further cause the processor to:
         receive, from the support tool transmitted to the handheld computing device, a command; and
         execute a service function based on the command.

2. The media player of claim 1, wherein the instructions, when executed by the processor, further cause the processor to establish, with the handheld computing device, a peer-to-peer network.

3. The media player of claim 2, wherein the instructions, when executed by the processor, further cause the processor to deny access to the peer-to-peer network from a second handheld computing device.

4. The media player of claim 1, wherein validating the login information includes instructions that, when executed by the processor, further cause the processor to confirm the handheld device is registered with the media player.

5. The media player of claim 1, wherein the instructions, when executed by the processor, further cause the processor to:
   receive a configuration change from the handheld computing device; and
   reconfigure a setting of the media player based on the configuration change.

6. The system of claim 1, wherein entering the service mode includes instructions that, when executed by the processor, further cause the processor to discontinue a normal mode of operation.

7. A system comprising:
   a handheld computing device comprising a first wireless network adapter; and
   a media player comprising a display, a second wireless network adapter, a processor, and a memory storing a support tool and instructions that, when executed by the processor, cause the processor to:
      receive, via the second wireless network adapter, login information from the handheld computing device,
      validate the login information,
      transmit the support tool to the handheld computing device upon validating the login information, the support tool specific to the handheld computing device, and
      enter a service mode of operation by the media player upon validating the login information and transmitting the support tool, wherein entering the service mode includes instructions that, when executed by the processor, further cause the processor to:
         receive, from the support tool transmitted to the handheld computing device, a command, and
         execute a function based on the command,
      wherein the handheld computing device is a known device to the media player and used to perform a service operation on the media player.

8. The system of claim 7, wherein the instructions, when executed by the processor, further cause the processor to establish, with the handheld computing device, a peer-to-peer network.

9. The system of claim 8, wherein the instructions, when executed by the processor, further cause the processor to deny access to the peer-to-peer network from a second handheld computing device.

10. The system of claim 7, wherein the instructions, when executed by the processor, further cause the processor to establish a screen sharing session with the handheld computing device.

11. The system of claim 7, wherein the instructions, when executed by the processor, further cause the processor to:
   receive a configuration change from the support tool transmitted to the handheld computing device; and
   reconfigure a setting of the media player based on the configuration change.

12. The system of claim 7, wherein the handheld computing device is one of a plurality of known devices, each of the plurality of known devices identifiable to the media player by a unique serial number or a token.

13. The system of claim 7, wherein entering the service mode includes instructions that, when executed by the processor, further cause the processor to discontinue a normal mode of operation.

14. A non-transitory computer readable medium storing instructions that, when executed by a processor, cause the processor to:
   receive, at a media player from a handheld computing device, login information, wherein the handheld computing device is a known device to the media player;
   validate the login information;
   transmit a support tool to the handheld computing device from the media player upon validating the login information, the support tool specific to the handheld computing device;
   enter a service mode of operation by the media player upon validating the login information and transmitting the support tool, wherein entering the service mode includes instructions that, when executed by the processor, further cause the processor to:
      receive, from the support tool transmitted to the handheld computing device, a command, and
      execute a function based on the command;
   discontinue a normal mode of operation; and
   display a diagnostic screen after discontinuing the normal mode of operation and entering the service mode.

15. The non-transitory computer readable medium of claim 14, wherein the instructions, when executed by the processor, further cause the processor to:

establish, between media player and the handheld computing device, a peer-to-peer network; and deny access to the peer-to-peer network from a second handheld computing device.

16. The non-transitory computer readable medium of claim 14, wherein validating the login information includes instructions that, when executed by the processor, further cause the processor to confirm the handheld device is one of a plurality of known devices registered with the media player.

17. The non-transitory computer readable medium of claim 14, wherein the instructions, when executed by the processor, further cause the processor to:

receive a configuration change from the support tool transmitted to the handheld computing device; and reconfigure a setting of the media player based on the configuration change.

* * * * *